CROSSBAR SWITCHES FOR USE IN AUTOMATIC TELEPHONE SYSTEMS

Filed Aug. 27, 1962 3 Sheets-Sheet 1

INVENTORS
LESLIE JAMES BROWELL.
JAMES FREDERICK DENBY.
BY
Irvin S. Thompson
ATTY.

CROSSBAR SWITCHES FOR USE IN AUTOMATIC TELEPHONE SYSTEMS

Filed Aug. 27, 1962

INVENTORS
LESLIE JAMES BROWELL
JAMES FREDERICK DENBY.
BY
Irwin G. Thompson
ATTY.

Nov. 10, 1964 L. J. BROWELL ETAL 3,156,780

CROSSBAR SWITCHES FOR USE IN AUTOMATIC TELEPHONE SYSTEMS

Filed Aug. 27, 1962 3 Sheets-Sheet 3

INVENTORS
LESLIE JAMES BROWELL
JAMES FREDERICK DENBY
BY Irwin S. Thompson
ATTY.

United States Patent Office 3,156,780

Patented Nov. 10, 1964

3,156,780

CROSSBAR SWITCHES FOR USE IN AUTOMATIC TELEPHONE SYSTEMS

Leslie James Browell, Heswall, and James Frederick Denby, Liverpool, England, assignors to Automatic Telephone & Electric Company Limited, Liverpool, England, a British company Filed Aug. 27, 1962, Ser. No. 219,546

Claims priority, application Great Britain, Sept. 20, 1961, 33,621/61

4 Claims. (Cl. 179—22)

Figure 1:
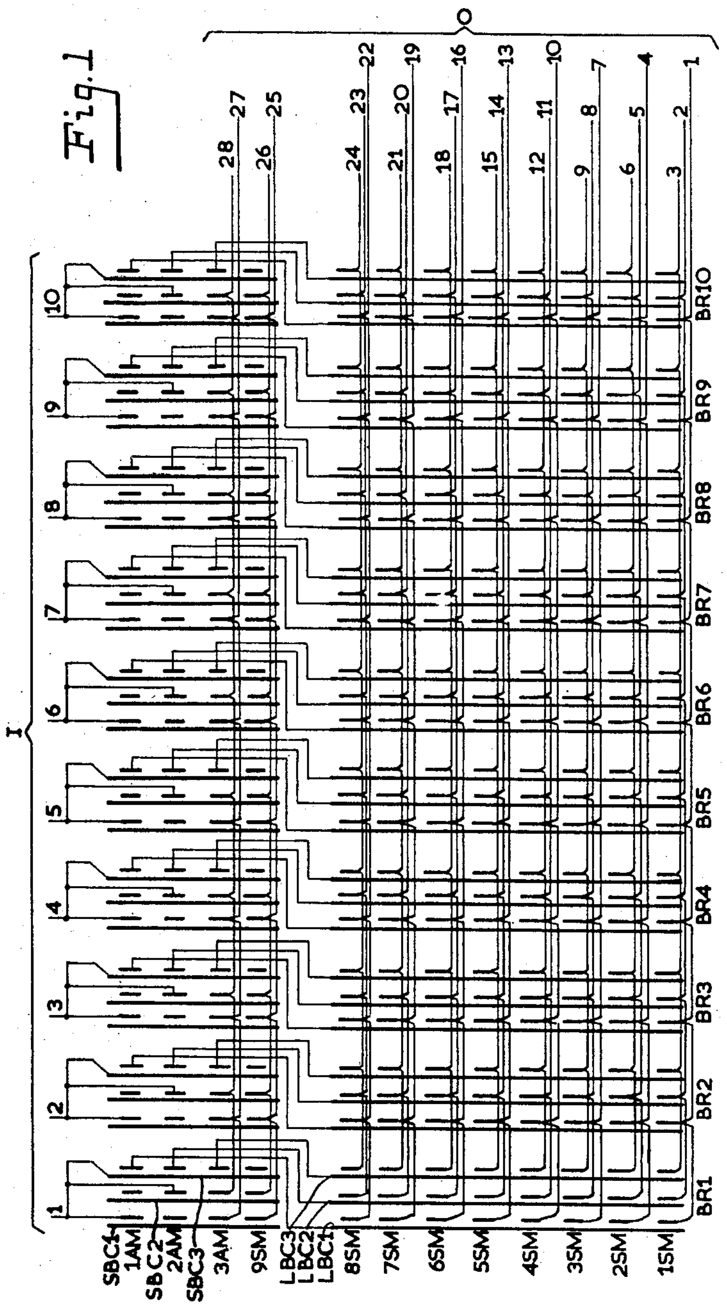

The present invention relates to crossbar switches of the type used in automatic telephone systems and the like, and is more particularly concerned with internal trunking arrangements for such switches.

In automatic telephone systems using crossbar switches over which conversational connections are established, it is essential from the point of view of economy to use the switches as efficiently as possible in the handling of traffic. Internal trunking arrangements for a crossbar switch have been proposed in which the outlet capacity is increased by the introduction of so-called triple-group working or three-way switching. In a typical switch of the 12 x 10 type, i.e., having 12 select magnets and 10 bridge magnets, each of the ten inlets of the switch, one for each bridge, is provided with access to a maximum of 26 outlets, which may be multiplied with corresponding outlets of the other bridges, or not, as required.

The object of the present invention is to provide arrangements for effecting a further increase in the outlet capacity of a crossbar switch in a simple and inexpensive manner without increasing the normal contact capacity of the switch crosspoints.

According to one aspect of the invention, a crossbar switch comprises an even number of select magnets, a plurality of bridge magnets, a plurality of bridges, one for each bridge magnet, a plurality of sets of bridge commons for each bridge, the bridge commons being severed at an effectively corresponding region of each of them into short bridge commons and long bridge commons, said short bridge commons and said long bridge commons having respectively a first and second group of select magnets associated therewith, contact crosspoints each appropriate to a particular select magnet and a particular bridge magnet, movable contacts in each crosspoint for engaging with the appropriate bridge commons on the operation of the particular select magnet and the particular bridge magnet, a plurality of inlets individual to different ones of said bridges, means connecting each inlet to one set of the short bridge commons to the associated bridge, means connecting movable contacts of said one set of short bridge commons and associated with different select magnets of said first group to different ones respectively of the sets of long bridge commons of said bridge and a plurality of outlets individually multiplied over movable contacts of corresponding sets of long bridge commons in all the bridges.

According to another aspect of the invention, a crossbar switch comprises an even number of select magnets, a plurality of bridge magnets, a plurality of bridges, one for each bridge magnet, a plurality of sets of bridge commons for each bridge, the bridge commons being severed at an effectively corresponding region of each of them to give short bridge commons and long bridge commons, said short-bridge commons and said long bridge commons having respectively a first group of select magnets and a second group of select magnets associated therewith, contact crosspoints each appropriate to a particular select magnet and a particular bridge magnet, movable contacts in each crosspoint for engaging with the appropriate bridge commons on the operation of the particular select magnet and the particular bridge magnet, a plurality of inlets individual to different ones of said bridges, means connecting each inlet to movable contacts of a crosspoint controlled by a first select magnet and associated with a first set of short bridge commons of a bridge, means connecting each inlet to movable contacts of a crosspoint controlled by a second select magnet and associated with a second set of short bridge commons of said bridge, means connecting each inlet to a third set of short bridge commons of said bridge, means connecting movable contacts of crosspoints associated with a third set of short bridge commons of said bridge and controlled by different select magnets to different sets respectively of the long bridge commons of said bridge, and a plurality of outlets individually multiplied over movable contacts of corresponding sets of long bridge commons in all the bridges and over other movable contacts associated with said first and second sets of short bridge commons in all the bridges and associated with at least one further select magnet.

According to yet another aspect of the invention, a crossbar switch comprises an even number of select magnets arranged in pairs, a plurality of bridge magnets, a plurality of bridges, one for each bridge magnet, a plurality of sets of bridge commons for each bridge, the bridge commons being severed at effectively corresponding regions of each of them into short bridge commons and long bridge commons, said short bridge commons and said long bridge commons having respectively a first group of at least three select magnets and a second group of select magnets associated therewith, contact crosspoints each appropriate to a particular select magnet and a particular bridge magnet, movable contacts in each crosspoint for engaging with the appropriate bridge commons on the operation of the particular select magnet and the particular bridge magnet, an inlet for one of said bridges, means connecting said inlet to movable contacts of a crosspoint controlled by a first select magnet of a pair in said first group and associated with a first set of short bridge commons of said one bridge, means connecting said inlet to movable contacts of a crosspoint controlled by a second select magnet of said pair and associated with a second set of short bridge commons of said one bridge, means connecting said inlet to a third set of short bridge commons of said bridge, means connecting movable contacts of said third set of bridge commons to different ones of said sets of long bridge commons of said bridge and a plurality of outlets for said bridge connected to movable contacts of sets of said long bridge commons and connected to other movable contacts associated with said first and second sets of short bridge commons and controlled by a third select magnet.

According to a further aspect of the invention, in a crossbar switch, at least one of its bridges has its bridge commons severed at effectively corresponding regions whereby short and long bridge commons appropriate respectively to a first group of at least three select magnets and a second larger group of select magnets are formed, and the arrangement of electrical connections of said bridge is such as to enable the inlet of the bridge to be selectively connected to any one outlet of two groups of outlets, connection to an outlet of one group of outlets being controlled by two select magnets of said first group whereas connection to an outlet of the other group of outlets is controlled by a select magnet of each of the first and second groups of select magnets.

According to a still further feature of the invention, in a crossbar switch, at least one bridge having one inlet and a plurality of outlets is effectively divided into first and second parts by severance of its bridge commons at effectively corresponding regions, said inlet being terminated on the first part which gives direct access to a first group of outlets, the first part also providing for selective switching of said inlet to any one of a plurality of sets of bridge commons of the second part which gives access to a second group of outlets.

Figure 2:
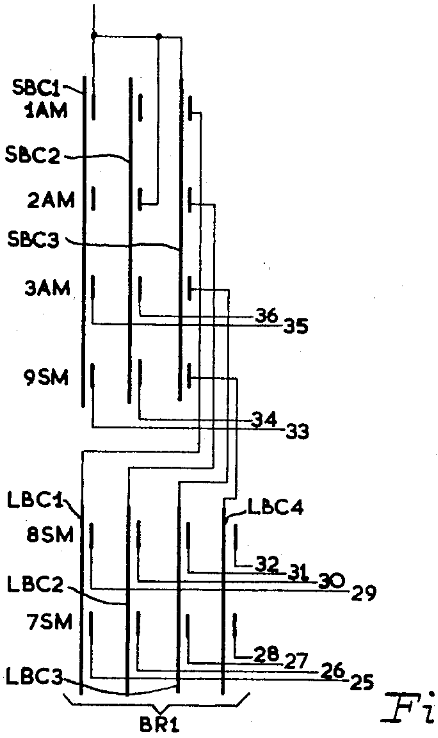
Figure 3:
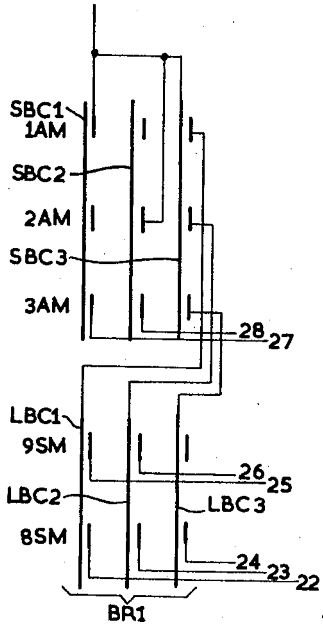
Figure 4:
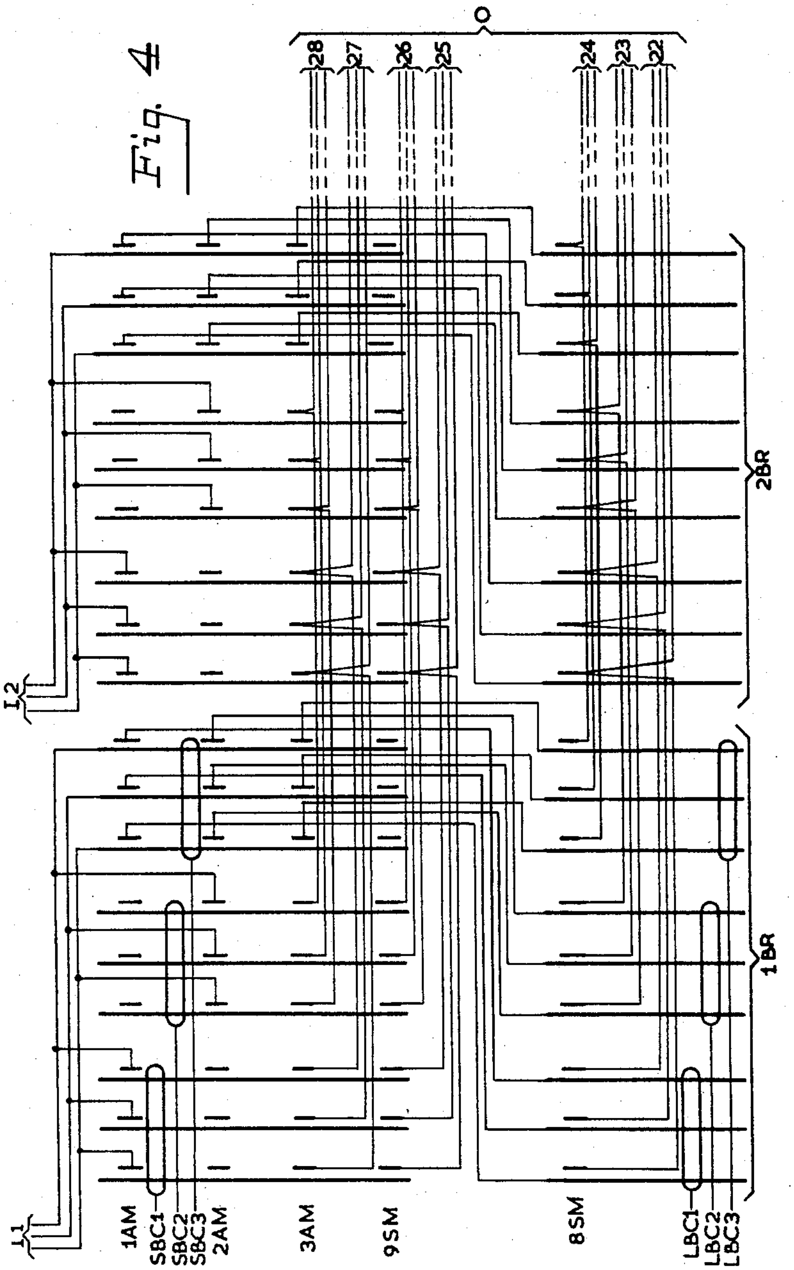

The invention will be better understood from the following description of one method of carrying it into effect which should be read in conjunction with the accompanying drawings comprising FIGS. 1 to 4. Of the drawings, FIG. 1 shows in skeletonised form the trunking arrangements of a 12 x 10 crossbar switch according to the invention, FIGS. 2 and 3 show partially alternative trunking arrangements to FIG. 1, and FIG. 4 shows in greater detail the trunking arrangements for two bridges of the crossbar switch.

Referring first to FIG. 1, this shows a 12 x 10 crossbar switch enabling ten inlets to be selectively connected to 28 outlets, the inlets and outlets being designated I1 to I10 and O1 to O28 respectively. The ten bridges BR1 to BR10 are represented vertically. The positions of the references 1SM to 9SM are indicative of the effective positions of nine select magnets with respect to the switch crosspoints which they control in each bridge, and likewise the references 1AM, 2AM and 3 AM correspond to the effective positions of what may be termed auxiliary select magnets with respect to other crosspoints in each bridge. It is pointed out that, for convenience of drawing only, the space between the rows of crosspoints relevant to magnets 8SM and 9SM has been somewhat enlarged. Actually all the rows are equally spaced but it is important to note that the bridge commons represented by long vertical lines are discontinued between the crosspoints of select magnets 8SM and 9SM.

In other respects the switch is preferably of the conventional type in which an individual axially-pivoted select bar, carrying a selecting finger for each bridge, is individually associated with each pair of select magnets 1SM and 2SM, 3SM and 4SM . . . 9SM and 3AM, and 2AM and 1AM. The operation of a select magnet swings the associated select bar in the appropriate direction whereby the fingers are so positioned with respect to corresponding crosspoints in each bridge as to enable one of said crosspoints to be actuated by subsequent operation of a bridge magnet. In this conventional type of crossbar switch, the mechanism of the crosspoint remains operated under control of the operated bridge magnet when the select magnet has been de-energized, i.e., the operative selecting finger remaining entrapped, to maintain the crosspoint actuated, after the select bar has returned to its rest position.

In the simplified illustration, each bridge is represented as having three long bridge commons, such as LBC1, LBC2 and LBC3 embracing the crosspoints of magnets 1SM to 8SM and three short bridge commons, such as SBC1, SBC2 and SBC3 relevant to the crosspoints of 9SM, 3AM, 2AM and 1AM. It may be taken that the long and short bridge commons are formed by severing the conventional bridge commons normally involving all the crosspoints of a bridge. Also in the illustration, the crosspoints of select magnets 1SM to 8SM in each bridge are represented as having three movable contact points (short vertical lines) individually associated with commons LBC1, LBC2 and LBC3. Additionally in each bridge, the illustration shows, in relation to auxiliary magnet 1AM, individual movable contact points for short bridge commons SBC1 and SBC3; in relation to auxiliary magnet 2AM, similar contact points for commons SBC2 and SBC3; in relation to auxiliary magnet 3AM, individual movable contact points for commons SBC1, SBC2 and SBC3; and in relation to select magnet 9SM, individual movable contact points for commons SBC1 and SBC2. From the illustration it appears that single-conductor connections are effected by the switch, but, in most practical applications, multi-conductor connections would have to be provided for. Indeed in one telephone system in which it is envisaged to use the switch, the paths through the switch would involve three conductors, i.e., A and B (speech) and P (private) conductors. This requirement is readily met by providing the switch with nine long and nine short bridge commons and a similar number of movable contacts at each of the crosspoints associated with select magnets 1SM to 8SM and auxiliary magnet 3AM, two groups of three movable contacts being provided in respect of the crosspoints controlled by auxiliary magnets 1AM and 2AM and select magnet 9SM. That is to say, in interpreting the drawing to meet this particular requirement, each bridge common and each movable contact would in fact represent three such items. FIG. 4 shows this particular arrangement in detail as regards select magnets 8SM, 9SM, 1AM to 3AM and bridges BR1 and BR2, the references in FIG. 4 having the same significance as those in FIG. 1.

Of the outlets O1 to O28, the first twenty-four are multipled through all ten bridges in the manner shown, i.e., on the basis of three outlets per crosspoint, so that the outlets are associated with the crosspoints of select magnets 1SM to 8SM as follows:

| | | | | | | | |
|---|---|---|---|---|---|---|---|
| Outlets | 1<br>2<br>3 | 4<br>5<br>6 | 7<br>8<br>9 | 10<br>11<br>12 | 13<br>14<br>15 | 16<br>17<br>18 | 19<br>20<br>21 | 22<br>23<br>24 |
| Select Magnets | 1SM | 2SM | 3SM | 4SM | 5SM | 6SM | 7SM | 8SM |

Two further outlets O25 and O26 are multiplied through the left-hand and central portions respectively of those partially equipped crosspoints associated with select magnet 9SM in all the bridges, whereas yet another pair of outlets O27 and O28 are similarly multipled through crosspoints associated with auxiliary magnet 3AM.

As regards the inlets I1 to I10, each of these is connected to bridges BR1 to BR10 respectively in identical manner. Considering inlet I1 typically, this is connected to the left-hand and central movable contacts of those crosspoints associated with auxiliary magnets 1AM and 2AM respectively, and to the right-hand short bridge common SBC3 which is involved in the crosspoints controlled by auxiliary magnets 1AM, 2AM and 3AM, and by select magnet 9SM. Bridge commons SBC1 and SBC2 are devoid of direct connections.

Now it is to be observed that, in each bridge, wire connections are employed between the right-hand movable contacts of the crosspoints of auxiliary magnets 1AM, 2AM and 3AM and the long bridge commons LBC1, LBC2 and LBC3 respectively. This arrangement enables three-way selective switching to be effected between, for example, inlet I1 and either of the long bridge commons LBC1, LBC2 and LBC3 of bridge BR1 under control of auxiliary magnets 1AM, 2AM and 3AM. A study of the drawing shows that the operation of any one of auxiliary magnets 1AM to 3AM together with the operation of any one of select magnets 1SM to 8SM would, upon subsequent operation of the relevant bridge magnet, establish a connection between the appropriate inlet and one of the outlets O1 to O24 as can be determined from the following table:

| Auxiliary magnet 1AM operated | | Auxiliary magnet 2AM operated | | Auxiliary magnet 3AM operated | |
|---|---|---|---|---|---|
| Select magnet operated | Outlet | Select magnet operated | Outlet | Select magnet operated | Outlet |
| 1SM | O1 | 1SM | O2 | 1SM | O3 |
| 2SM | O4 | 2SM | O5 | 2SM | O6 |
| 3SM | O7 | 3SM | O8 | 3SM | O9 |
| 4SM | O10 | 4SM | O11 | 4SM | O12 |
| 4SM | O13 | 5SM | O14 | 5SM | O15 |
| 6SM | O16 | 6SM | O17 | 6SM | O18 |
| 7SM | O19 | 7SM | O20 | 7SM | O21 |
| 8SM | O22 | 8SM | O23 | 8SM | O24 |

Thus the three-way selective switching facility provided by the right-hand portion of the crosspoints associated with auxiliary magnets 1AM, 2AM and 3AM in all the bridges enables selective switching between any one of the ten inlets of the selector and any one of outlets O1 to O24.

The remaining four outlets O25 to O28 will now be considered. Of these outlets O25 and O27 are multipled over the movable contacts of the left-hand portions of the crosspoints, in all the bridges, associated with 9SM and 3AM respectively, whereas outlets O26 and O28 are multipled over the movable contacts of the central portions of those crosspoints respectively. Taking bridge BR1 typically, inlet I1 being connected to the movable contact (or contacts in the case of multi-conductors paths) of the left-hand portion of the crosspoint associated with auxiliary magnet 1AM will be connected to outlet O25 when magnets 1AM and 9SM are operated and followed by the operation of the bridge magnet, or alternatively, if magnets 1AM and 3AM are employed, the inlet I1 will be connected to outlet O27. Furthermore, since inlet I1 is also connected to the movable contact (or contacts in the case of multi-conductor paths) of the central portion of the crosspoint associated with auxiliary magnet 2AM, that inlet can be selectively connected either to outlet O26, under control of magnets 2AM and 9SM, or to outlet O28 under control of magnets 2AM and 3AM.

It will be appreciated that when any through connection has been set up under control of a pair of select magnets (one of which may be an auxiliary select magnet) and a bridge magnet, that connection is maintained upon release of the select magnets until the bridge magnet is finally released.

It should be noted that various modifications can be effected in the arrangements described and illustrated without departing from the scope of the invention. Thus, although in each bridge the short bridge common SBC3 (or the group of bridge commons which may be inferred thereby) together with the associated movable contacts controlled by magnets 1AM, 2AM and 3AM have been employed for the three-way selective switching function, any short bridge common (or group of commons) and indeed any three of the four movable contacts (or contact sets) associated therewith might well be used for this purpose. Moreover as regards outlets O25 to O28, these can be accommodated by four of the remaining eight part crosspoints (involving the remaining two short bridge commons) in various ways although the inlets must be associated with part crosspoints relevant to magnets 1AM and 2AM or 3AM and 9SM, and the outlets must be involved in the crosspoints not associated with the inlets. One of the factors which mitigates against other variations is that the physical arrangement of the crossbar switch mechanism precludes the effective operation of two select (or auxiliary) magnets associated with the same select bar.

In any event it will now be understood that the invention permits each bridge of a crossbar switch having twelve select magnets, to be used for establishing a connection from one inlet to any one of 28 outlets with the wastage of only three part crosspoints which, however, need not be fitted.

It will also be understood that the number of select magnets and crosspoints associated with the long bridge commons may be varied to cater for different outlet capacities. Thus if, for instance, that number is increased to twelve the outlet capacity would be $3\times12+4=40$.

It is again pointed out that, although for simplicity of illustration, the switch has been represented as providing for single-conductor through-connections, multi-conductor paths, e.g., three conductors, would in all probability be provided for, the only limitation being the contact capacity of the crosspoints.

The principles already described can also be extended to give four-way switching, instead of three-way switching, from one short bridge common (or set of bridge commons) in each bridge, whereby access is obtained to a number of outlets equal to four times the number of select magnets associated with crosspoints involving the long bridge commons, plus four outlets derived in the manner described. Such an arrangement is shown diagrammatically in FIG. 2 as regards select magnets 7SM to 9SM and 1AM to 3AM and bridge BR1 and it will be noted the four long bridge commons and three short bridge commons are required, the fourth short bridge common being unused or removed.

Another alternative to the arrangements illustrated in the drawing, and which also enables each bridge of a twelve select-magnet switch to give access to 28 outlets, is provided by severing the normal bridge commons between magnets 3AM and 9SM instead of between magnets 9SM and 8SM. The inlets are connected as already described. One of the short bridge commons produced by the severance, then permits 3-way selective switching to be effected in respect of 26 outlets associated with the three long bridge commons, one of the part crosspoints relevant to select magnet 9SM being unusable since magnets 9SM and 3AM can not be effective concurrently. Two other outlets are obtained from the two part crosspoints associated with magnet 3AM. Such an arrangement is shown diagrammatically in FIG. 3 as regards select magnets 8SM, 9SM and 1AM to 3AM and bridge BR1.

As regards the last-mentioned arrangements, these may again be modified according to the number of select magnets associated with crosspoints involving the long bridge commons. In any event the permissible number of outlets will be three times the number of said select magnets minus one plus the two outlets obtained from the crosspoints related to auxiliary magnet 3AM.

We claim:

1. A crossbar switch comprising an even number of select magnets, a plurality of bridge magnets, a plurality of bridges, one for each bridge magnet, a plurality of sets of bridge commons for each bridge, the bridge commons being severed at an effectively corresponding region of each of them into short bridge commons and long bridge commons, said short bridge commons and said long bridge commons having respectively a first and second group of select magnets associated therewith, contact crosspoints each appropriate to a particular select magnet and a particular bridge magnet, movable contacts in each crosspoint for engaging with the appropriate bridge commons on the operation of the particular select magnet and the particular bridge magnet, a plurality of inlets individual to different ones of said bridges, means connecting each inlet to one set of the short bridge commons of the associated bridge, means connecting movable contacts of said one set of short bridge commons and associated with different select magnets of said first group to different sets respectively of the long bridge commons of said bridge and a plurality of outlets individually multipled over movable contact of corresponding sets of long bridge commons in all the bridges.

2. A crossbar switch comprising an even number of select magnets, a plurality of bridge magnets, a plurality of bridges, one for each bridge magnet, a plurality of sets of bridge commons for each bridge, the bridge commons being severed at an effectively corresponding region of each of them to give short bridge commons and long bridge commons, said short-bridge commons and said long bridge commons having respectively a first group of select magnets and a second group of select magnets associated therewith, contact crosspoints each appropriate to a particular select magnet and a particular bridge magnet, movable contacts in each crosspoint for engaging with the appropriate bridge commons on the operation of the particular select magnet and the particular bridge magnet, a plurality of inlets individual to different ones of said bridges, means connecting each inlet to movable contacts of a crosspoint controlled by a first select magnet and associated with a first set of short bridge commons of a bridge, means connecting each inlet to movable contacts of a crosspoint controlled by a second select magnet and associated with a second set of short bridge commons of said bridge, means connecting each inlet to a third set of short bridge commons of said bridge, means connecting movable contacts of crosspoints associated with a third set of short bridge commons of said bridge and controlled by different select magnets to different sets respectively of the long bridge commons of said bridge, and a plurality of outlets individually multipled over movable contacts of corresponding sets of long bridge commons in all the bridges and over other movable contacts associated with said first and second sets of short bridge commons in all the bridges and associated with at least one further select magnet.

3. A crossbar switch comprising an even number of select magnets arranged in pairs, a plurality of bridge magnets, a plurality of bridges, one for each bridge magnet, a plurality of sets of bridge commons for each bridge, the bridge commons being severed at effectively corresponding regions of each of them into short bridge commons and long bridge commons, said short bridge commons and said long bridge commons having respectively a first group of at least three select magnets and a second group of select magnets associated therewith, contact crosspoints each appropriate to a particular select magnet and a particular bridge magnet, movable contacts in each crosspoint for engaging with the appropriate bridge commons on the operation of the particular select magnet and the particular bridge magnet, an inlet for one of said bridges, means connecting said inlet to movable contacts of a crosspoint controlled by a first select magnet of a pair in said first group and associated with a first set of short bridge commons of said one bridge, means connecting said inlet to movable contacts of a crosspoint controlled by a second select magnet of said pair and associated with a second set of short bridge commons of said one bridge, means connecting said inlet to a third set of short bridge commons of said bridge, means connecting movable contacts of said third set of bridge commons to different sets respectively of the long bridge commons of said bridge and a plurality of outlets for said bridge connected to movable contacts of sets of said long bridge commons and connected to other movable contacts associated with said first and second sets of short bridge commons and controlled by a third select magnet.

4. A crossbar switch comprising an even number of select magnets, a plurality of bridge magnets, a plurality of bridges, one for each bridge magnet, a plurality of sets of bridge commons for each bridge, the bridge commons being severed at an effectively corresponding region of each of them to give short bridge commons and long bridge commons, said short bridge commons and said long bridge commons having respectively a first group of at least three select magnets and a second larger group of select magnets associated therewith, contact crosspoints each appropriate to a particular select magnet and a particular bridge magnet, movable contacts in each crosspoint for engaging with the appropriate bridge commons on the operation of the particular select magnet and the particular bridge magnet, a plurality of inlets individual to different ones of said bridges, means connecting an inlet to movable contacts of a crosspoint controlled by a first select magnet of said first group of select magnets and associated with a first set of short bridge commons of a bridge, means connecting said inlet to movable contacts of a crosspoint controlled by a second select magnt of said first group of select magnets and associated with a second set of short bridge commons of said bridge, means connecting said inlet to a third set of short bridge commons of said bridge, means connecting movable contacts of crosspoints associated with said third set of short bridge commons of said bridge and controlled by different select magnets of said first group to different sets respectively of the long bridge commons of said bridge, a first group of outlets individually multipled over movable contacts of crosspoints controlled by select magnets of said first group of select magnets and a second group of outlets individually multipled over movable contacts of crosspoints controlled by select magnets of said second group of select magnets, whereby an inlet is connected to an outlet of said first group of outlets by the operation of two select magnets of said first group of select magnets and is connected to an outlet of said second group of outlets by the operation of a select magnet of said first group of select magnets and by the operation of a select magnet of said second group of select magnets.

References Cited in the file of this patent

UNITED STATES PATENTS

| | | |
|---|---|---|
| 2,761,012 | Murray et al. | Aug. 28, 1956 |
| 3,115,553 | Corner | Dec. 24, 1963 |